2,930,708

INHIBITING CORROSION IN METALS

Herbert Walter Chatfield, Croydon, England, assignor to A. Boake, Robert & Company Limited, London, England No Drawing. Application March 11, 1957
Serial No. 644,989

Claims priority, application Great Britain March 19, 1956

5 Claims. (Cl. 106—14)

This invention relates to oleo-resinous coating compositions containing a corrosion inhibiting agent.

It is known that unsaturated organic acids and esters thereof can be oxidised in such a way that epoxy groups

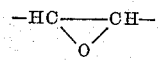

are formed across the double bonds in the acid or the acid portion of the ester. Thus in U.S. specification No. 2,485,160 there is described the epoxidation of esters of oleic and linoleic acid by treatment with hydrogen peroxide and formic acid, the hydrogen peroxide being in slight excess over that theoretically required to convert the double bonds present in the molecule into epoxy groups. Other epoxidised oils can be similarly prepared from drying or semi-drying oils. The epoxidised oils above described have been used as plasticisers and stabilisers for polyvinyl chloride and the present invention is based on the discovery that the addition of a small quantity of an epoxidised oil to an oleo-resinous surface coating composition is of value in inhibiting corrosion of ferrous metals when the composition is applied to steel and the coated steel is subjected to conditions which normally induce corrosion. Instead of adding the epoxidised oil to the coating composition the drying or semi-drying oil constituent of the coating composition may be partly epoxidised by the introduction of epoxy groups at the double bonds until the required amount of epoxy groups are introduced.

By the term "epoxidised oil" as used in this specification is meant an unsaturated fatty acid oil or the acids derived from the said oils in which the unsaturation has been partly or wholly removed by the formation of epoxy groups across double bonds, for example, by treating the said oil or acid with hydrogen peroxide in the presence of formic or acetic acid.

According to the present invention an oleo-resinous corrosion inhibiting surface coating composition contains an epoxidised oil as above defined.

A particular feature of the invention is an oleo-resinous coating composition into the drying or semi-drying oil ingredients of which has been introduced epoxy groups.

The composition according to the invention may be prepared by directly adding to the finished oleo-resinous coating composition an epoxidised oil as above defined. Alternatively the drying or semi-drying oil component in making the oleo-resinous composition may be pre-treated to reduce its unsaturation by forming epoxy groups therein.

Oils which after epoxidation may be used in preparing the compositions according to the invention are those vegetable and animal oils which have an iodine value not less than about 80 and preferably do not contain a high proportion of conjugated double bond constituents because these constituents are not so easily epoxidised. Examples of such oils are sunflower seed, soya bean, colza, cotton seed, hemp seed, linseed and olive oils, as well as fish oils having high iodine values contain constituents with a number of double bonds. Unsaturated liquid glycerides separated from oils of animal origin are also suitable. Such oil materials, when epoxidized, form oily compounds that have lost double bonds of unsaturation by reason of formation of epoxy groups in the fatty chain group or radical.

The invention includes a method of inhibiting corrosion in metals, particularly ferrous metals, according to which the metal is coated with a coating composition as above described. Alternatively the corrosion-inhibiting composition may be formed in situ by coating the metal with the epoxidised oil and then a paint or other protective coating composition compatible with the epoxidised oil may be applied to the metal thus protected.

The amount of the epoxidised oil in the composition is not critical. Thus, for example, with a particular oleo-resinous varnish based on linseed oil and fused Congo copal, in the ratio of 5:4, thinned with about 35% of white spirit to 65% of oil and resin, and containing the usual lead and cobalt driers, the addition of 1% epoxidised oil has been found to confer definite anti-corrosion properties, i.e. the degree of corrosion of the underlying steel is less marked than when the same varnish which has not been treated has been used for protection. The beneficial effect of the epoxidised oil appears to be proportional to the amount present up to a 5% addition, at which point complete protection against corrosion appears to be attained after exposure to standard test conditions.

The following examples illustrate the anti-corrosion properties of coating compositions containing different proportions of the same epoxidised oil on the one hand and the same proportions of different epoxidised oils on the other hand:

Example 1

A varnish based on linseed oil and run Congo copal in the ratio of 5:4 containing cobalt driers and known to have inferior anti-corrosion properties, was used as the basis for the assessment.

This experimental varnish contained 1% of 3% cobalt driers and a portion was divided into four test samples to three of which epoxidised soya bean oil in different amounts was added:

(1) Varnish untreated.
(2) Varnish to which was added 1% epoxidised oil having an epoxy oxygen content of 6%.
(3) Varnish to which was added 2% epoxidised oil having epoxy oxygen content of 6%.
(4) Varnish to which was added 5% epoxidised oil having an epoxy oxygen content of 6%.

These were examined initially for drying properties and were all found to be satisfactory, i.e. the presence of the epoxidised oil had no appreciable inhibiting effect on the drying times.

The varnishes were applied to bright steel panels as single coats and allowed to dry for seven days. They were then exposed to standard corrosion test conditions in a cabinet operating at 42-48° C. and 100% humidity for ten days.

The same series of test samples were applied as before to bright steel panels and air dried for seven days and one set subjected to continuous salt spray for ten days and another set to weatherometer tests (160 hours in intermittent water spray with continuous U.V. light).

Under all three test conditions the panel with the varnish containing no epoxidised oil showed considerable corrosion of the metal and failure of the surface coating. These effects were progressively reduced with increasing amounts of epoxidised oil, and the panels with the varnishes containing 5% epoxidised oil were relatively free from corrosion or failure of the film.

*Example 2*

Another portion of the same experimental varnish used in Example 1 was divided into four test samples, to three of which the same proportion of different epoxy oils were added:

(1) Varnish untreated.
(2) Varnish to which was added ½% epoxy olein.
(3) Varnish to which was added ½% epoxy elaidised vegetable oil having an epoxy oxygen content of 6%.

These treated varnishes were applied to bright steel panels and after drying and ageing for four days were subjected to standard corrosion test conditions in a cabinet operating at 42–48° C. and 100% humidity for ten days.

At the end of this period the films were examined and evaluated. Varnishes 2 and 3 showed corrosion inhibiting properties vastly superior to the control varnish No. 1. Varnish No. 2 however was distinctly the best of the series.

*Example 3*

This example illustrates the anti-corrosion action of an epoxidised oil having an epoxy oxygen content of 6% in the absence of any other anti-corrosive agent, i.e. pigment.

0.5% of epoxidised soya bean oil was added to a simple linseed oil/Congo copal varnish, 1¼:1. This, with a control (containing no epoxidised oil) was applied to bright steel, and after drying, was exposed in a corrosion cabinet operating at 100%+humidity and at 42–48° C. (for 240 hours).

Below are the results of these tests:

Varnish+epoxidised oil: Slight fine surface rusting limited to about one quarter of area.
Control: Considerable definite corrosion over the whole of the area.

The presence of this small amount of epoxidised soya bean oil was thus found to have a very important effect in arresting corrosion.

The above was in the nature of an exploratory assessment, and the establishment of the anti-corrosive activity of an epoxidised vegetable oil leads to its exploitation in coatings specifically used for protection against corrosion.

An example of this exploitation is given below and involves red lead primers.

*Example 4*

This example illustrates the advantage of using an epoxidised oil in a red lead primer and shows that additions of it could be made to conventional types of red lead primers for steel, and that a reduction in red lead content is possible.

At the same time a direct comparison was made between the above and a synthetic drying oil made from the inter-action of epoxidised soya bean oil and linseed oil fatty acids (as described in our co-pending application No. 34,852/56) and boiled linseed oil.

Details of these paints are given below:

| Ref. | Test No.1 | Test No.2 | Test No.3 | Test No.4 | Test No.5 |
|---|---|---|---|---|---|
| Red lead | 60 | 40 | 20 | 60 | 60 |
| Micronised mica | 10 | 20 | 15 | 10 | 10 |
| Titanium dioxide (Anatase) | | | 10 | | |
| Dark boiled oil + drier (1% of 3% Co) | 15 | 15 | 15 | | 20 |
| Soya bean oil having an epoxy oxygen content of 6% | 5 | 5 | 5 | | |
| Synthetic oil [1] | | | | 20 | |
| White spirit | 8 | 12 | 10 | 13 | 9 |

[1] NOTE.—The synthetic oil was the reaction product from the inter-action of equal parts of epoxidised soya bean oil and linseed oil fatty acids.

These paints were then applied as single coats to bright steel panels, and exposed to the corrosion conditions in a weatherometer for 264 hours. At the end of this period the panels were stripped and the metal surfaces examined for corrosion.

The results are given below:

| Ref. | Blistering | Corrosion | |
|---|---|---|---|
| | | Through coating | On metal only |
| Test No. 1 | None | None | Very slight surface. |
| Test No. 2 | do | do | Do. |
| Test No. 3 | do | do | Do. |
| Test No. 4 | Slight | do | Very slight surface and slight deep-seated. |
| Test No. 5 | Appreciable | do | Appreciable and deep. |

The above paints were also examined for storage stability, and in particular for viscosity change, settlement of pigment, and ease of redispersion.

| Duration of Storage | Viscosity, BSS Cup, 25° C. | | | | |
|---|---|---|---|---|---|
| | 1 | 2 | 3 | 4 | 5 |
| | Secs. | Secs. | Secs. | Secs. | Secs. |
| After 1 week | 60 | 70 | 58 | 81 | 60 |
| After 2 weeks | 60 | 70 | 60 | 85 | 62 |

(Original viscosity—60 secs.)

| Ref. | Settlement | | Ease of redispersion | |
|---|---|---|---|---|
| | After 1 week | After 2 weeks | After 1 week | After 2 weeks |
| 1 | Moderate; Fairly hard. | Slightly increased; Hard. | Fairly easy. | Fairly easy. |
| 2 | do | do | do | Do. |
| 3 | Moderate; Soft | Moderate; Soft | Easy. | Easy. |
| 4 | do | do | do | Do. |
| 5 | Moderate; Fairly hard. | Moderate; Fairly hard. | Fairly easy. | Fairly easy. |

Epoxidised soya bean oil has thus been found to have beneficial effects in red lead paints, in respect of improvement of anti-corrosion properties, especially when added as such, but also when used as a synthetic oil, made by its reaction with linseed oil fatty acids as described in our co-pending application above referred to.

The results indicate that the introduction of the epoxidised oil permits the red lead content of these primers to be substantially reduced, without noticeable detriment to anti-corrosion properties.

This also results in better brushing characteristics, and in pigment settlements which are softer and easier to redisperse.

I claim:

1. A film-forming corrosion-inhibiting oleoresinous varnish composition comprising an oleoresinous material prepared from a fatty oil material selected from the group consisting of drying and semi-drying oils containing long chain fatty acid radicals and a resinous material and a corrosion-inhibiting epoxidized oil material derived from an unsaturated oil selected from the group consisting of drying and semi-drying oils and fatty acids derived from such oils having an iodine value of not less than about 80 before epoxidation and in which the unsaturation has been at least partially removed by the formation of epoxy groups across double bonds in a fatty radical portion of said oil-derived material.

2. An oleoresinous film-forming coating composition having a corrosion-inhibiting property for ferrous surfaces, said composition comprising a mixture of a film-forming oleoresinous and a fatty oil material wherein the fatty oil portion of the film-former is selected from the group consisting of drying and semi-drying oil materials containing long chain fatty acid radicals including corrosion-inhibiting epoxy groups contained in up to about 5% long chain fatty groups derived from unsaturated oils selected from the group consisting of drying and semi-drying oils and fatty acids derived from such oils having an iodine value of not less than about 80 before epoxidation and in which the unsaturation has been at least partially removed by the formation of said epoxy groups across double bonds in said fatty radicals.

3. A film-forming oleoresin composition having corrosion-inhibiting properties when applied to a metal surface comprising in combination a fused oleoresinous material and a fatty oil material selected from the group consisting of drying and semi-drying oils and containing epoxidized long chain fatty acid groups derived from an unsaturated oil material selected from the group consisting of drying and semi-drying oils and fatty acids derived from such oils having an iodine value of not less than about 80 before epoxidation and in which the unsaturation has been at least partially removed by the formation of epoxy groups across double bonds in said fatty radicals.

4. A corrosion-inhibiting film-forming fatty oil base primer coating composition for coating metal surfaces and used with oleoresinous metal paints comprising a pigmented oil vehicle primer modified with an epoxidized oil material derived from unsaturated oil materials selected from the group consisting of drying and semi-drying oils and fatty acids derived from such oils having an iodine value of not less than about 80 before epoxidation and in which the unsaturation has been at least partially removed by the formation of epoxy groups across the double bonds in said oil-derived material.

5. A method of inhibiting corrosion in ferrous metals which comprises forming a corrosion inhibiting oleoresinous surface-coating composition in situ on the metal by first coating the metal with a composition consisting essentially of an oil selected from the group consisting of vegetable and animal oils having an iodine value not less than about 80 in which the unsaturation has been at least partly removed by the formation of epoxy groups across double bonds and thereafter applying a paint to the metal thus treated.

References Cited in the file of this patent

UNITED STATES PATENTS

| | | |
|---|---|---|
| 2,485,160 | Niederhauser et al. | Oct. 18, 1949 |
| 2,541,027 | Bradley | Feb. 13, 1951 |
| 2,671,064 | Cowell et al. | Mar. 2, 1954 |

OTHER REFERENCES

Chatfield: Varnish Constituents, Interscience Publishers, Inc., New York, 1944, page 192.